United States Patent [19]
Redford

[11] Patent Number: 5,218,771
[45] Date of Patent: Jun. 15, 1993

[54] ORIENTATION SENSING APPARATUS

[76] Inventor: Peter M. Redford, 22293 Old Logging Rd., Los Gatos, Calif. 95030

[21] Appl. No.: 868,835

[22] Filed: Apr. 15, 1992

[51] Int. Cl.⁵ .......................... G01C 9/06; G01D 5/34
[52] U.S. Cl. .................................... 33/366; 250/231.1; 250/574
[58] Field of Search .......... 33/366; 250/231.1, 231.11, 250/574

[56] References Cited

U.S. PATENT DOCUMENTS

| | | | |
|---|---|---|---|
| 3,371,424 | 3/1968 | Sweet | 33/366 |
| 3,863,067 | 1/1975 | Gooley | 33/366 |
| 4,755,801 | 7/1988 | Gooley | 33/366 X |

FOREIGN PATENT DOCUMENTS

| | | | |
|---|---|---|---|
| 154030 | 3/1962 | U.S.S.R. | 33/366 |
| 800637 | 1/1981 | U.S.S.R. | 33/366 |

Primary Examiner—William A. Cuchlinski, Jr.
Assistant Examiner—C. W. Fulton
Attorney, Agent, or Firm—Rosenblum, Parish & Isaacs

[57] ABSTRACT

Orientation sensing apparatus including a bubble suspended in liquid contained within a transparent cylindrical container, light sources aligned along the cylindrical axis of the container that transmit light via light pathways for illuminating the bubble, light sensors disposed along the circumference of the container that receive light via light pathways for measuring the amount of light reflected from the bubble, and signal processing circuitry for converting the light sensors' readings into an orientation indicating signal for communication to other electronic devices.

44 Claims, 7 Drawing Sheets

ORIENTATION SENSING APPARATUS

BACKGROUND OF THE INVENTION

1. Field of the Invention

This invention relates generally to orientation sensors, and more particularly to an improved sensor for producing electrical signals corresponding to angular position about a generally horizontal axis.

2. Brief Description of the Prior Art

It is well established that a spirit (or carpenter's) level comprised of a transparent elongated vial enclosing a fluid and a bubble can be used to indicate a level orientation. Further, it has been recognized that the light transmission, reflection or refraction characteristics associated with a fluid-filled spirit level can be utilized by light sensitive electronic devices to remotely and more accurately sense level status. For example, U.S. Pat. No. 4,154,000 shows a transparent elongated spirit level device utilizing pairs of concentrated light beam sources and photodetectors configured so that the position of a bubble can be sensed by the disruption of a refracted light beam's path through a liquid. Such a device, using two pairs of sources and detectors located near the middle of the vial, can fairly effectively determine whether a "level" condition exists. However, if measurement of the off-level angle is desired, additional source/sensor pairs spaced along the length of the vial must be employed. In such a configuration, the position of the bubble in the vial (which corresponds to the off-level angle) is determined by which of the source/detector beams has been interrupted. However, the precision of such a device's measurements is severely limited by the number of source/detector pairs employed, which is usually limited by space constraints and beam overlap considerations. Further, the angular range of measurement of such an elongated spirit level is usually limited to just a few degrees off-level.

International Pat. App. No. PCT/F189/00083 discloses an elongated spirit level device in which multiple sources are mounted along the side perimeter of the vial, and a photodetector is mounted directly below the center of the vial. As the light sources are sequentially lit, readings are taken from the photodetector measuring the amount of light reflected from the bottom of the bubble. After readings have been taken corresponding to all of the sources, a computer can compare the readings and determine the bubble's location within the vial. It is evident that such an arrangement would require complex electronics to perform the sequential lighting of the sources and the corresponding synchronous measurements of the photodetector. Further, the speed of such a device is necessarily limited by the speed at which the sources can be sequentially turned on and off, as well as the speed at which the computer can measure, process and compare the photodetector readings.

SUMMARY OF THE INVENTION

It is therefore a primary objective of the present invention to provide an improved orientation sensing apparatus that produces electrical signals corresponding to its angular orientation about a generally horizontal axis.

Another objective of the present invention to provide an improved orientation sensing apparatus having features which accommodate high-speed sensing of angular position.

Another objective of the present invention to provide an improved orientation sensing apparatus that can sense a full 360 degrees of angular orientation.

Another objective of the present invention to provide an improved orientation sensing apparatus that produces signals readily usable by a microprocessor.

Briefly, a preferred embodiment of the present invention includes a bubble suspended in liquid contained within a transparent cylindrical container, light sources aligned along the cylindrical axis of the container that transmit light via light pathways for illuminating the bubble, light sensors disposed along the circumference of the container that receive light via light pathways for measuring the amount of light reflected from the bubble, and signal processing circuitry for converting the light sensors' readings into an orientation signal for communication to other electronic devices.

Among the advantages of the present invention is that its simple design makes it more reliable and less expensive than existing sensors.

Another advantage of the present invention is that it allows high speed sensing of angular orientation.

Yet another advantage of the present invention is that it produces electrical signals that can be easily input by a microprocessor.

A further advantage of the present invention is that it can provide accurate measurement of angular position throughout a full 360 degrees of rotation.

These and other objects and advantages of the present invention will no doubt become apparent to those skilled in the art after having read the following detailed description of the preferred embodiment which is contained in and illustrated by the various drawing figures.

IN THE DRAWING

Figure 4A:
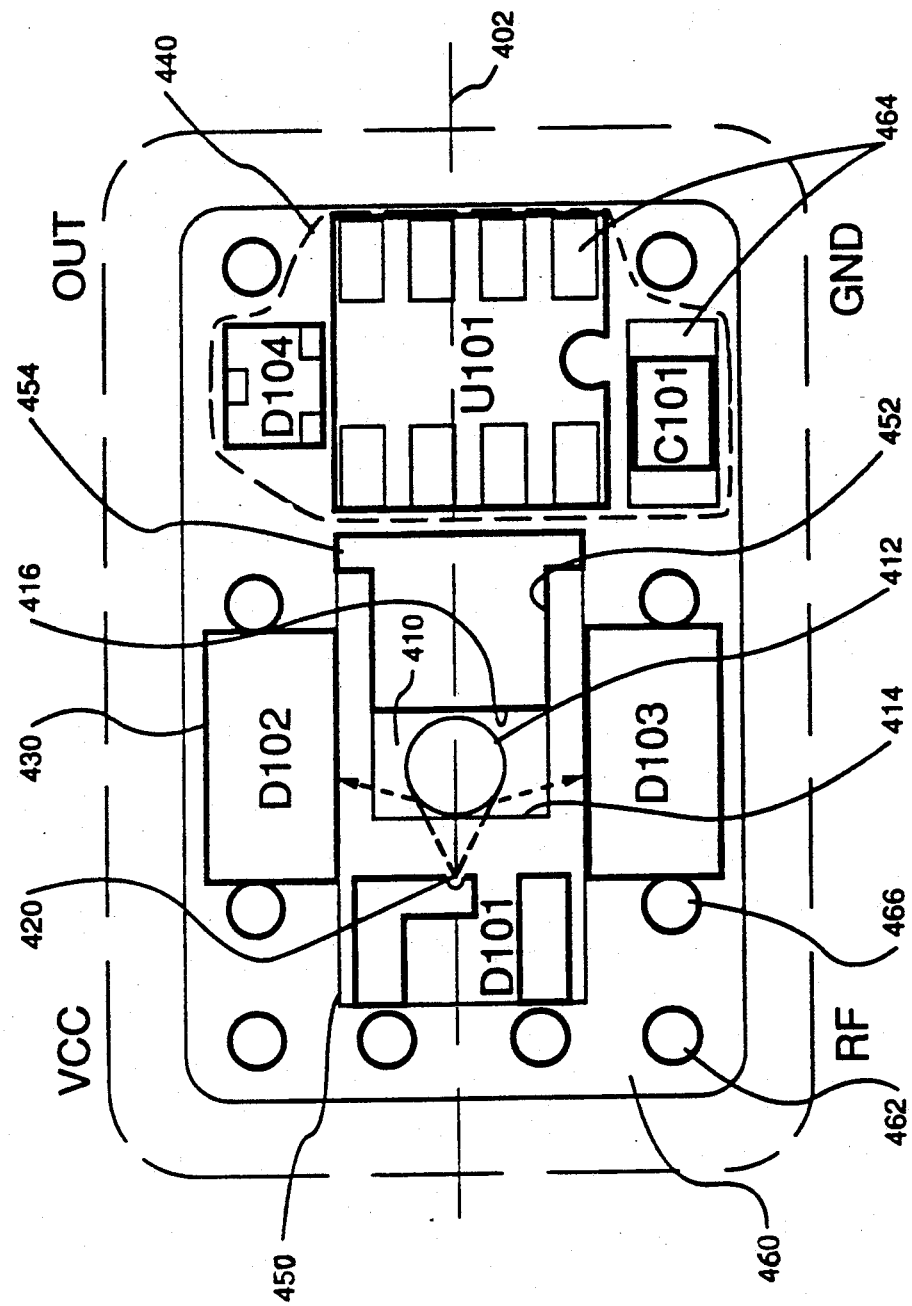
Figure 4B:
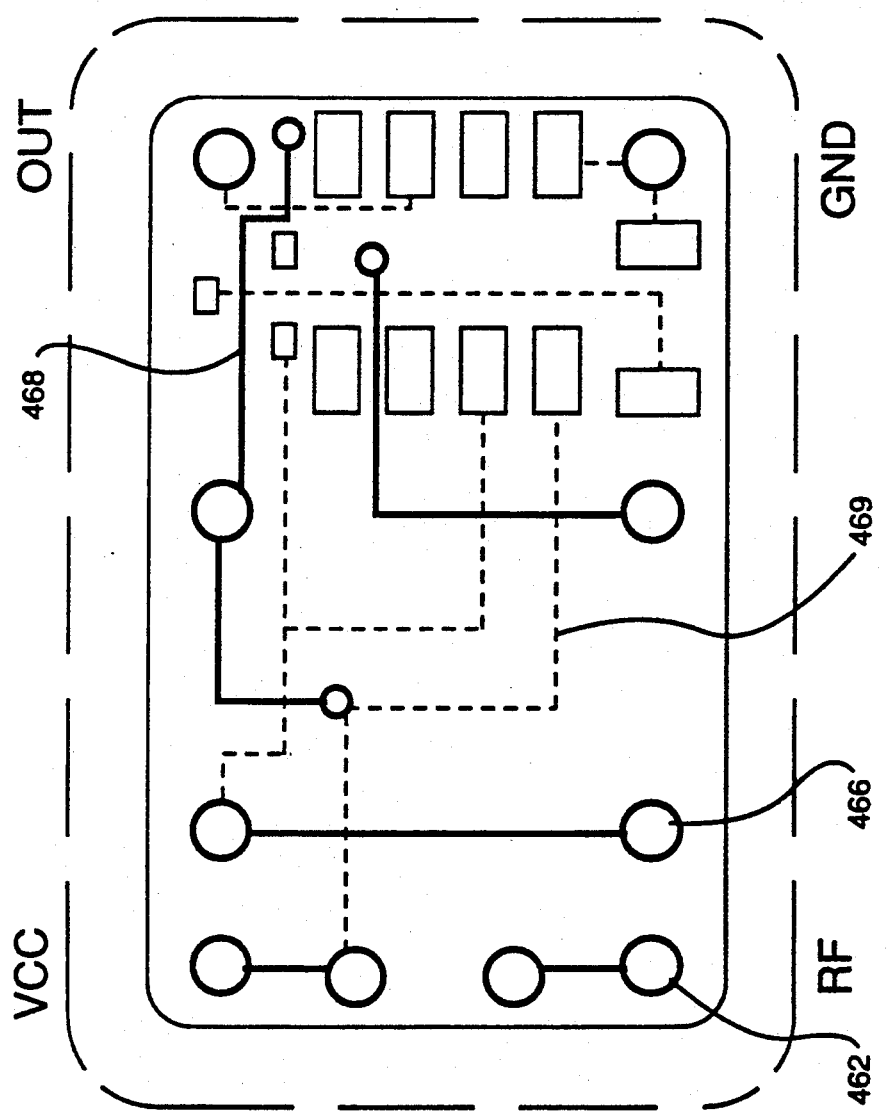
Figure 5:
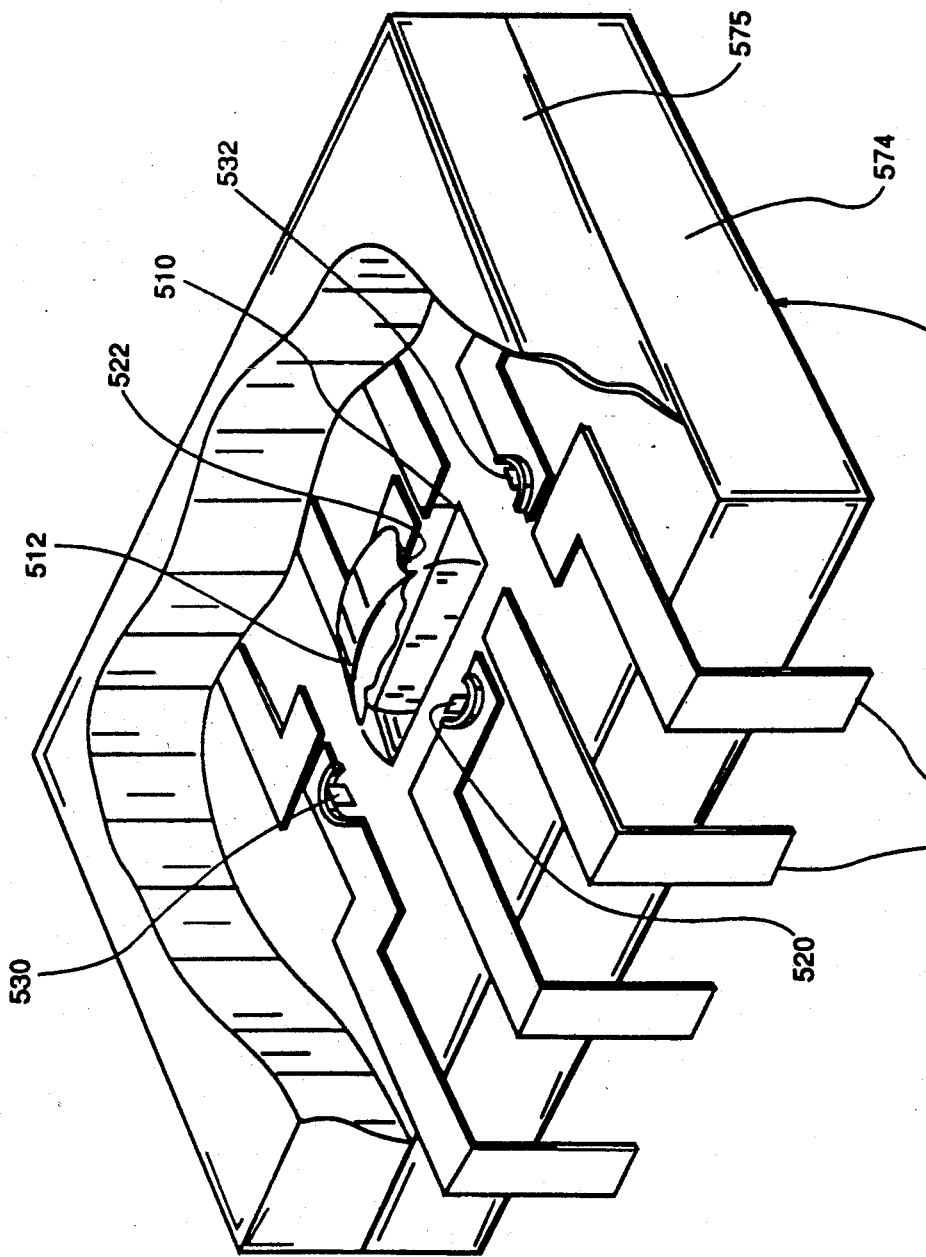
Figure 6:
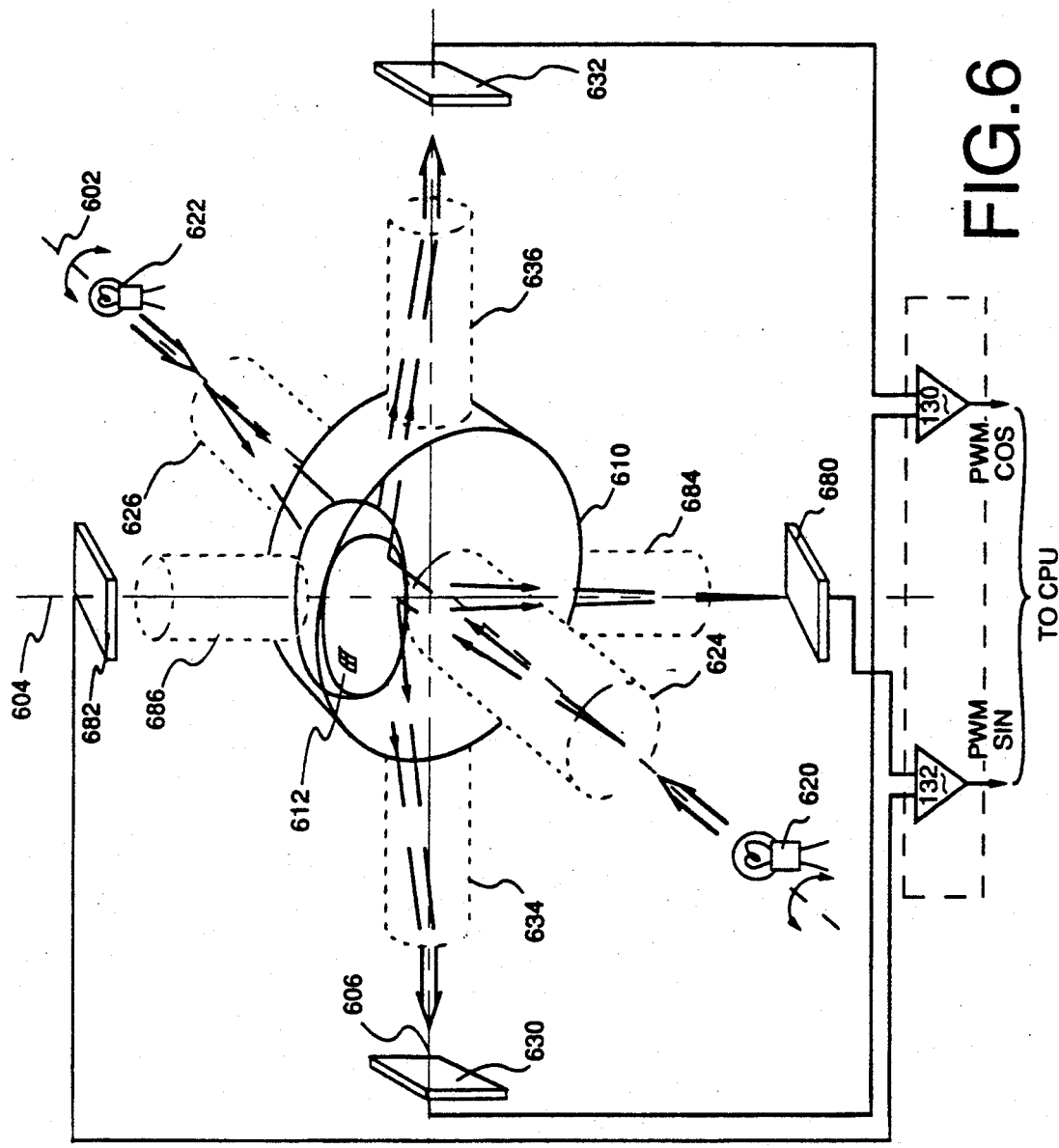

FIGS. 3a, 3b, and 3c represent output waveforms of signal processing circuitry in accordance with the present invention;

FIG. 4(a) is an illustration showing circuit board of components in an embodiment of the present invention;

FIG. 4(b) is an illustration showing a circuit board layout of conductive tracings in an embodiment of the present invention;

FIG. 5 is an illustration showing an alternate embodiment of the present invention; and FIG. 6 is a functional representation of another alternate embodiment of the present invention.

DETAILED DESCRIPTION OF THE PREFERRED EMBODIMENT

Figure 1:
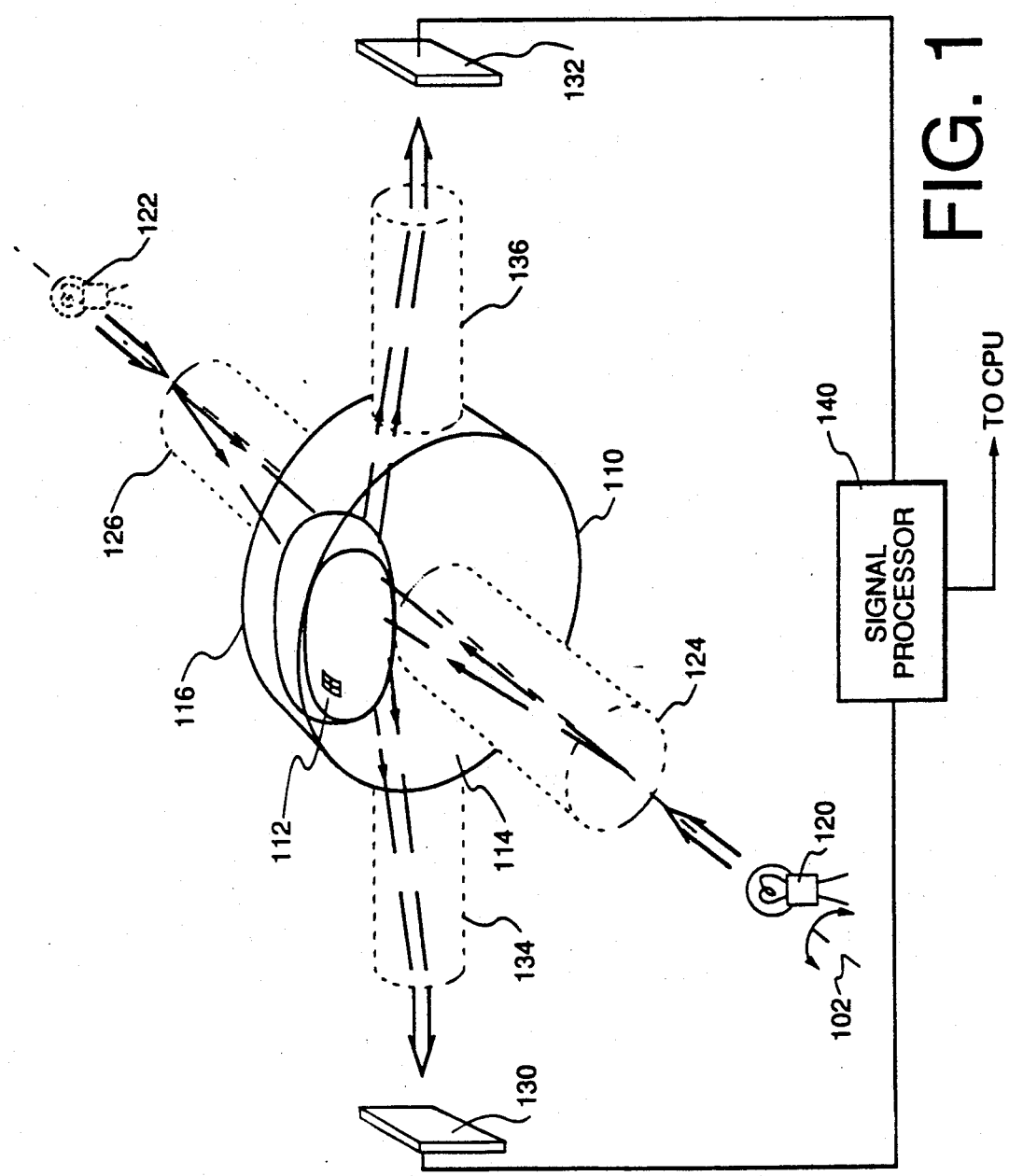
FIG. 1 is a functional representation of an embodiment of the present invention.

FIG. 1 depicts a functional representation of an embodiment of the present invention for producing electrical signal corresponding to angular orientation about a generally horizontal axis. The sensor includes a bubble 112, of air or other gas for example, suspended in a liquid, such as a light oil for example, contained within a transparent cylindrical container 110, illuminated by a light source 120 positioned facing one of the flat end faces, 114 or 116, of the cylindrical container 110 along its central axis 102. The central axis 102 is the axis of rotation of the cylindrical container 110. The materials used to form the bubble 112 and the liquid are preferably chosen so that the interface surface formed between them is highly reflective; for example, an air bubble in oil. Two light-measuring sensors 130 and 132 positioned facing each other, 180 degrees apart around the circumference of the cylindrical container 110, receive light reflected from bubble 112. Optionally, light pathways 124, 134 and 136 may be used to communicate the light from the source 120 to the container 110, and from the container to the sensors 130 and 132. The outputs of the sensors 130 and 132 are fed to signal processing circuitry 140 which produces an orientation signal based on the readings of the sensors for use by a microprocessor.

The cylindrical container 110 is preferably shaped as a relatively "short" cylinder, whose diameter significantly exceeds its axial length. Ideally, the axial length of container 110 will be approximately equal to the width of the bubble 112 (in the axial direction). Further, the container may be formed as a separate transparent container, or it may be formed as a cylindrical cavity in a larger housing (not shown). Light source 120 may be a light-emitting diode (LED) or any other suitable light source. Sensors 130 and 132 may be photodiodes, phototransistors or any suitable devices which are sensitive to light intensity. The light source 120 and the sensors 130 and 132 ar fixed relative to the container 110 by any suitable means. The optional light pathways 124, 134 and 136 may be formed of optical fibers, "light pipes" or any medium suitable for communicating light. If such pathways are used, pathway 124 must be configured and located so that light is transmitted along the central axis 102 of the cylindrical container 110 to illuminate the bubble 112, and pathways 134 and 136 must be configured and located so that light reflected from the bubble 112 may be received along paths 180 degrees apart around the circumference of the container 110. The size of bubble 112 and the spread of the light beam emitted from source 120 must be such that the bubble is always illuminated at any position it may assume within the container 110.

In operation, as the detector is rotated about the central axis 102 (the axis of rotation of the cylindrical container 110), the bubble 112 will move around the interior circumference of the cylindrical container 110 in response to gravitational forces acting on the heavier liquid. Light from the source 120 passing through the flat end face 114 of container 110 will be reflected from the reflective interface between the bubble 112 and the liquid. The angular rotation of the detector is detected by measuring the amount of the reflected light which falls upon each of the two light-measuring sensors 130 and 132, which face each other o opposite sides along the circumference of the container 110. The sensors 130 and 132 produce s differential current in relation to the angular position of the bubble relative to the container 110. More specifically, as the bubble 112 moves around the interior circumference of the container 110, more light is reflected to one sensor than the other, causing the current from one sensor to decrease as the current in the other sensor increases. Sensor currents are equal when the bubble 112 is positioned at 90 (or 270) degrees relative to the centerline of pathways 134 and 136 (the "level" condition), and differ when the bubble is at any other position. The sensor currents are fed to signal processing circuitry 140 which compares the currents and produces a corresponding orientation signal in a form readily usable by a microprocessor.

Optionally, a second light source 122 may be mounted on the opposite side of the cylindrical container 110 along its central axis 102 to transmit light via optional light pathway 126 and through flat end face 116 in order to provide additional illumination of the bubble 112. This provides the benefit of making the sensor relatively insensitive to off-axis rotation, because movement of the bubble closer to either flat end face of the container 110 (which would be the result of off-axis rotation) does not materially affect the total amount of light reflected to each sensor.

The illustrated motion detector is capable of detecting angular orientation about one axis, i.e., the central axis 102 which is the axis of rotation of the cylindrical container 110. Ideally, the axis 102 would have a generally horizontal direction, but the device will be functional in indicating angular orientation about any non-vertical axial orientation. In order to simultaneously detect two-dimensional angular orientation, two angular motion detectors are required, mounted with their respective central axes oriented perpendicular to each other.

In traditional electronic devices, signal processing circuitry for the conversion of low-level analog signals for computer processing in real-world, noisy environments commonly consisted of two stages: amplification of the signal by a conventional instrumentation amplifier, and conversion to a digital signal format by an analog-to-digital converter (ADC). The conventional instrumentation amplifier, based on an IC op amp, has been traditionally used for such signal processing applications due to its inherent rejection of common-mode noise and its linear amplification of DC and low frequency AC signals. Since a desired low-level signal may have an amplitude of only a few millivolts, while common-mode noise may be several volts, common-mode rejection is critical to the overall accuracy of the amplifier. However, several problems exist with conventional instrumentation amplifiers: they are often expensive they offer only finite amplification and s must often be followed with single-ended amplifier stages; they have an input voltage offset which limits their ability to amplify very-small (sub-millivolt) signals; and their output is analog, and for computer applications must therefore be converted to a digital signal format using an expensive ADC where noise is easily picked up and accuracy is easily lost.

The signal processing circuitry 140 developed for use in the present invention functions as a digital instrumentation amplifier (DIA), which converts low-level differential analog signals to a digital signal format readily usable by a microprocessor. This novel circuitry overcomes the problems associated with conventional instrumentation amplifiers and analog-to-digital converters, because a double-ended analog signal is input directly to the DIA, in many cases requiring no preamplification. The output of the DIA is a pulse-width modulated (PWM) square wave that can be applied directly to a microprocessor for analysis. This output waveform contains the double-ended (differential) signal information and the microprocessor can digitally filter out any noise. Since the information is carried in differential form, common mode noise is automatically rejected because such noise is applied to both signals equally, thus effectively cancelling the common mode noise.

Figure 2:
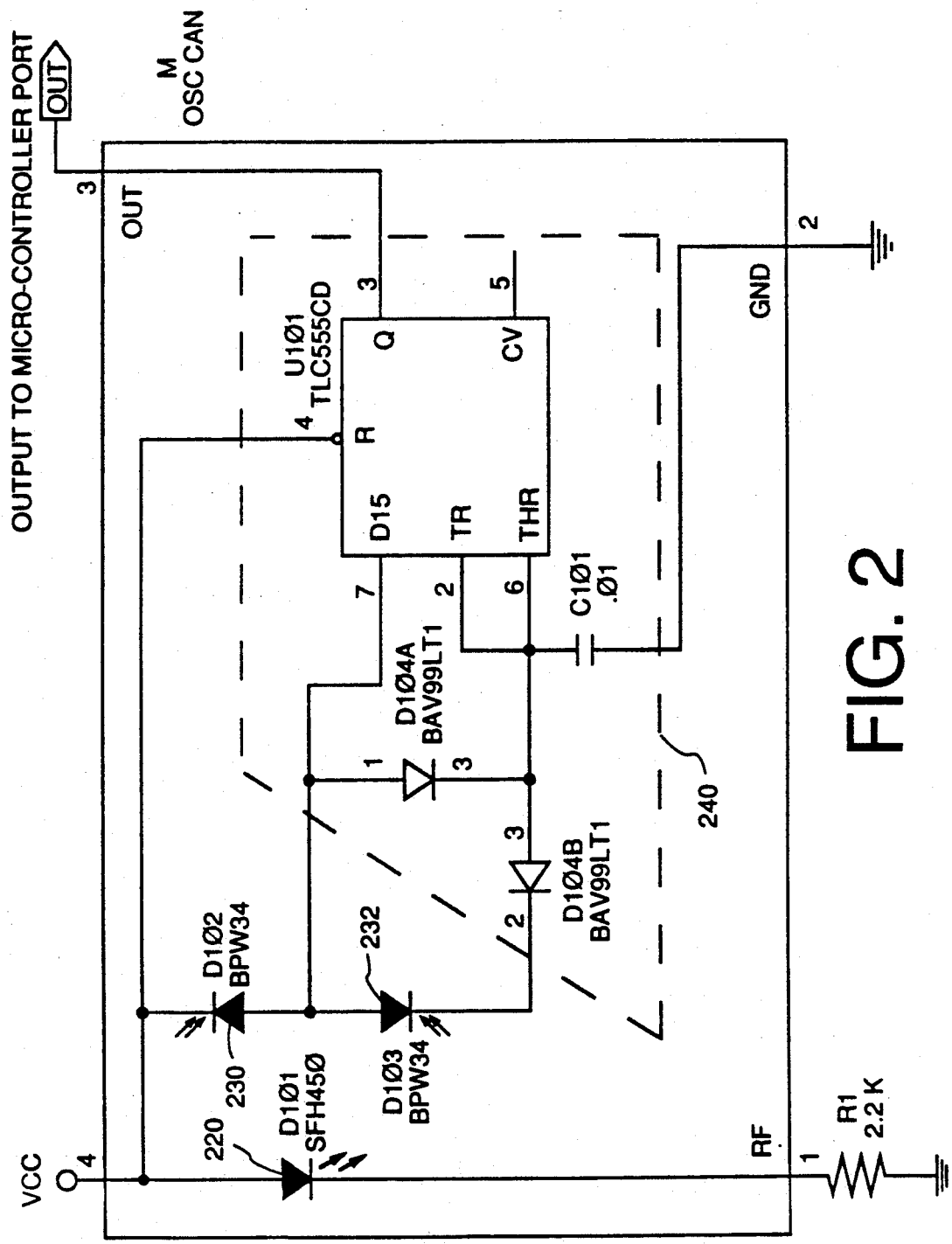
FIG. 2 is an electronic schematic of an implementation of an embodiment of the present invention.

In FIG. 2, an electronic schematic showing an implementation of the present invention is shown. A Siemens SFH450 fiber optic emitter is used as the light source 220, while Siemens BPW34 photodiodes are used as sensors 230 and 232. The signal processing circuitry 240 is composed of a TI TLC555C timer chip U101, Motorola BAV99LT1 dual switching diodes D104A and D104B, and a 0.01 μF capacitor C101. Four I/O connections are provided to allow connection to and from the device: VCC, OUT, RF and GND. VCC and GND are standard electronic power and ground level connections, and OUT provides an output connection for the pulse width modulated output signal. RF (frequency resistor) is provided for connection of an external resistor which determines the relative frequency of oscillation of the output signal.

The signal processing circuitry 240 used in the present invention, which functions as a DIA (described above), is based on an industry standard 555 timer chip U101 configured as a 50% duty cycle oscillator. The signal processing circuitry 240 further includes dual switching diodes D104A and D104B and a 0.01 μF capacitor C101. In this configuration, capacitor C101 is alternately charged through photo diode 230 and switching diode D104A, and discharged through photo diode 232 and switching diode D104B. Device U101 is designed to hold its output (pin 3) high while C101 is charging and low while it is discharging, thus producing a square wave output.

The respective levels of illumination of photo diodes 230 and 232 determine the rate at which C101 is charged and discharged. Hence, if both photo diodes are equally illuminated (a "level" condition), the charge rate and discharge rate are equal, thus making the duty cycle of the square wave output 50%. If illumination of the photo diodes is not equal, the duty cycle of the output is not 50%. That is, as one photo diode receives more current than the other, the high (or low) portion of each cycle of the square wave output will occupy a larger percentage of the total output waveform, thus indicating a change in angular position. Hence, the relative change in duty cycle of the output represents relative angular motion.

The input to the DIA is truly differential since an electrical or optical common mode noise present in the system is applied equally to both photo diodes 230 and 232, having equal effect on the high and low portions of the square wave oscillator output waveform. This noise is thus automatically cancelled out when the microprocessor calculates relative motion values from the oscillator output by computing the difference between the high and low portions of the square wave output.

The Siemens SFH450 fiber optic emitter 220 is connected to the VCC connection to receive power, and connected via connection RF to a resistor R1 which provides a path to ground. The resistance of R1 determines the amount of current which passes through emitter 220, thereby determining the amount of light emitted by emitter 220. This determines the amount of light received by photodiodes 230 and 232, which in turn determines the oscillation speed of the signal processing circuitry 240 and the output signal. Thus, resistor R1, connected to the RF connection, determines the oscillation frequency of the output signal.

Figure 3:
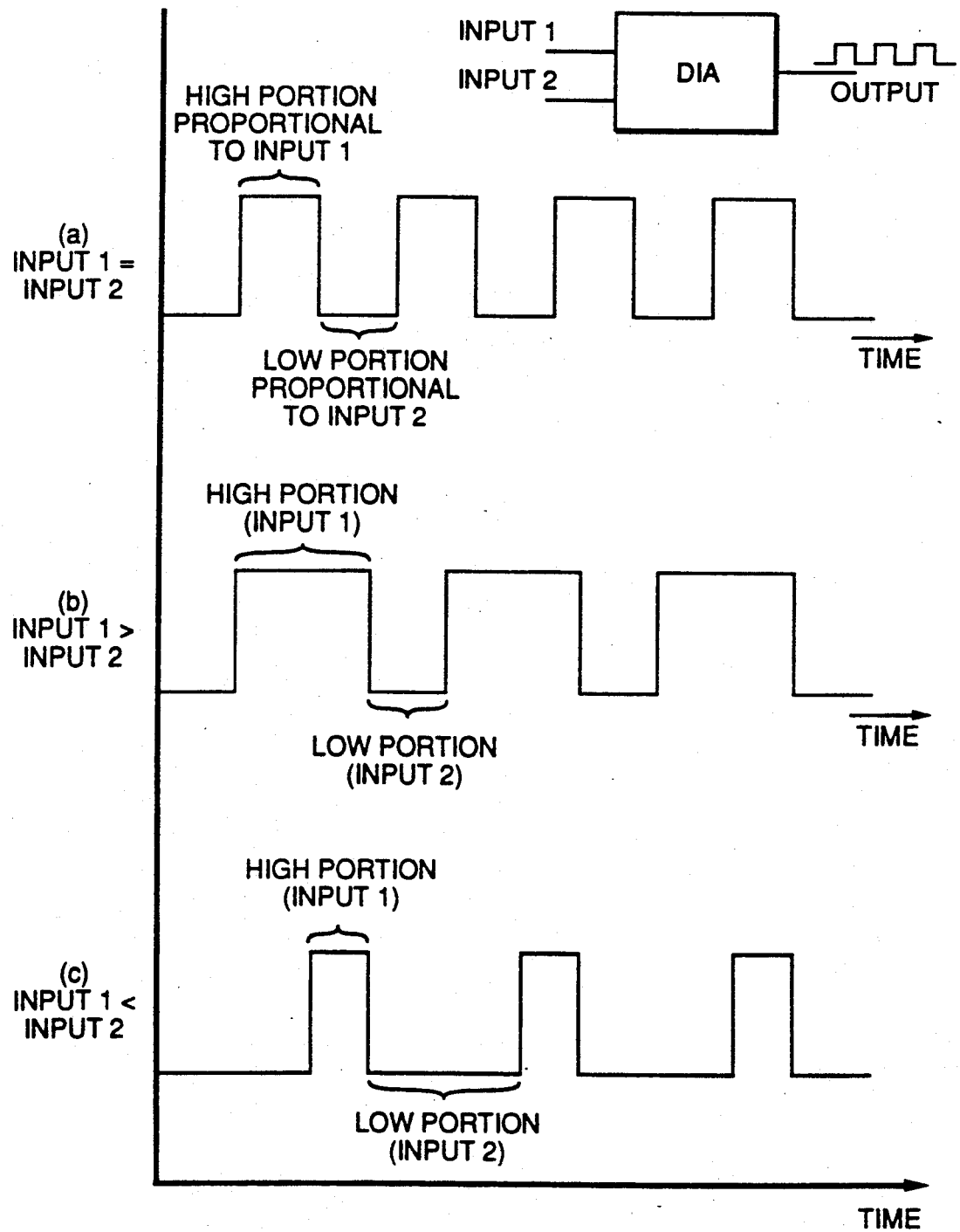

FIG. 3 illustrates graphically the pulse width modulated square wave output of a DIA as it varies over time. As indicated in the figures, the amount of time that the output is held high is proportional to the value of the first analog input, and the amount of time that the output is held low is proportional to the second analog input. FIG. 3(a) depicts the DIA output waveform when both analog inputs are of equal value. FIG. 3(b) represents the output waveform when the value of the first analog input exceeds the second, and in FIG. 3(c) the second analog input exceeds the first. In the context of the orientation sensor of the present invention, FIG. 3(a) would represent a "level" condition, FIG. 3(b) would represent a tilt in one direction around the cylindrical axis, and FIG. 3(c) would represent a tilt in the other direction around the cylindrical axis.

The DIA described above is capable of processing signals from any sort of resistive sensors, including voltage, current, light or temperature controlled resistors. The configuration of the DIA used in the present invention processes signals from light controlled resistors (photodiodes).

In FIG. 4(a), an illustration of the circuit board component layout for the embodiment of the present invention described in FIG. 2 (above) is shown. A Siemens SFH450 fiber optic emitter D101 consists of a light emitting diode 420 and a transparent cylindrical housing 450 (shown in axial cross section). The housing has a cylindrical bore 452 normally intended for receiving the end of an optical fiber. The light emitting diode 420 is located at the end of the housing 450 opposite the cylindrical bore, so that it illuminates the hollow central cavity 410 of the housing. The other end of the housing 450 is initially open, allowing the cavity to be filled with a quantity of liquid (alcohol or oil, for example) and a gas bubble 412. The cylindrical cavity 410 is subsequently closed and sealed by the insertion of a custom plastic plug 454, which may fabricated from any suitable material, including plastic, stainless steel or aluminum.

This assembly is then mounted on a circuit board 460, and Siemens BPW34 photodiodes 430 and 432 are likewise mounted on the circuit board on both sides (around the circumference) of transparent cylindrical emitter housing 450. The components of the signal processing circuitry 440, comprised of a TI TLC555C timer chip U101, a Motorola BAV99LT1 dual switching diode D104, and a 0.01 μF capacitor C101, are mounted on the circuit board 460 as well.

The innermost end wall 414 of cylindrical bore 452, and the end 416 of plug 454 correspond to the cavity end faces 114 and 116 depicted in FIG. 1. If the plug 454 is made of a reflective material, such as steel or aluminum, the end 416 of the plug will reflect some of the light emitted from LED 420 back toward the bubble 412, providing improved tolerance to off-axis rotation. This improvement is similar to that achieved by the optional addition of a second source as described with reference to FIG. 1.

The solid black circles 462 at each corner of the circuit board represent module I/O pins for the external connections described in FIG. 2 (above). The shaded rectangles 464 represent surface mount (SMD) connections, while the outlined white circles 466 represent through-hole connections.

FIG. 4(b) is an illustration of the layout of conductive tracings used to interconnect the components on the circuit board depicted in FIG. 4(a). As in FIG. 4(a), the solid black circles 462 at each corner of the circuit board represent module I/O pins for the external connections described in FIG. 2 (above), the shaded rectangles represent surface mount (SMD) connection pads 464, and the large outlined white circles 466 represent through-hole connections. The small outlined white circles 467 represent inter-level via connections for conduction between the component-side (top) and the solder-side (bottom) of the board. The solid black lines 468 represent solder-side conductive tracings, while the dotted lines 469 represent conductive tracings on the component-side. The tracings shown implement the wiring depicted in the schematic of FIG. 2 (above).

FIG. 5 depicts an alternate embodiment of the present invention. A dual-inline package (DIP) device 570 is formed by sandwiching infrared light emitting diodes (LEDs) 520 and 522, infrared photodiodes 530 and 532 and conductive tracings 572 between two rectangular plastic sections 574 and 575 (the top section 575 is substantially cut-away in order to show the components). A sealed cylindrical cavity 510 is formed by two complementary semi-cylindrical recesses or indentations in the interior faces of the sections 574 and 575. The cavity 510 is almost filled with a liquid, such that a small air bubble 512 is left in the cavity. Two infrared LEDs 520 and 522 are positioned in the housing facing each other along the central cylindrical axis of the cavity 510 so that they each illuminate one of the flat end faces of the cavity. Two infrared photodiodes 530 and 532 are positioned in the housing, 180 degrees apart around the circumference of the cavity 510. Eight conductive traces 572 are connected to the LEDs 520 and 522 and the photodiodes 530 and 532 and protrude from the DIP 570 forming leads for connection to external circuitry. The DIP sections 574 and 575 are fabricated from a material that is transparent to infrared light and is preferably of daylight filter plastic so that ambient light does not affect the infrared photodiodes. In this implementation, signal processing circuitry (not shown in this figure) would normally be mounted separately on a supporting circuit board in similar fashion to that illustrated in FIG. 4(a).

With reference to FIG. 6, a functional representation of an alternate embodiment of the present invention is shown. This embodiment includes four (rather than two as described above) light-measuring sensors (630, 632, 680 and 682) mounted at 90 degree intervals around the circumference of the cylindrical container 610, which receive reflected light from the bubble 612, optionally via light pathways 634, 636, 684 and 686. The use of four sensors allows the sensor to sense a full 360 degrees rotation around central axis 602, rather than the 180 degrees possible in the previously described embodiments. In the previous embodiments, the sensor was unable to distinguish between a level, right side up orientation and a 180 degree, or upside down, orientation. The addition of two more sensors, mounted along an axis 604 perpendicular to the axis 606 of the first two sensors, makes such a distinction possible, thereby allowing full 360 degree sensing.

The signal processing circuitry 640 of this embodiment includes two DIA's 642 and 644. As shown, the first pair of sensors (630 and 632) are connected to the first DIA 642, and the second pair of sensors (680 and 682) are connected to the second DIA 644. The outputs of both DIAs can be fed to a microprocessor CPU or other computer system. Both of the PWM difference signals produced by the DIAs and read by the microprocessor vary in a sinusoidal manner with respect to the angular position of the detector, and the sinusoidal variations of the two signals are 90 degrees out of phase. Thus, the two DIA output signals are designated as pulse-width modulated sine (PWM SIN) and cosine (PWM COS) signals in the figure. The microprocessor can apply a standard table lookup scheme performing an inverse-tangent operation to convert the outputs to an angle representing the orientation of the detector.

Although the present invention has been described above in terms of specific embodiments, it is anticipated that alterations and modifications thereof will no doubt become apparent to those skilled in the art. For example, instead of the bubble in oil embodiment described above, the invention might include a spherical or quasi-spherical reflector which rolls around the curved bottom surface of the cylindrical container under the influence of gravity to perform substantially the same function as the bubble depicted in the drawing figures. It is therefore intended that the following claims be interpreted as covering all such alterations and modifications as fall within the true spirit and scope of the invention.

What is claimed is:

1. Orientation indicating apparatus for indicating angular position about an axis of interest, comprising:
   sensor means including
      a housing forming a generally cylindrical chamber having a non-vertically oriented central axis coincident with the axis of interest;
      a rotation responsive element located within said chamber and free to move therein around the perimeter of the chamber under the influence of gravity as the housing is rotated about the central axis, the element being capable of influencing the direction of light cast upon it as a function of its location within said chamber;
   light emitting means disposed along said central axis, including at least one light emitting component disposed along said central axis and facing said chamber and operative to illuminate said element; and
   light detecting means including first and second light measuring components disposed on opposite sides of said chamber and along a first detection axis passing through said chamber, said first detection axis and said central axis being mutually perpendicular, said first and second light measuring components being responsive to light influenced by said element and operative to generate corresponding first and second detection signals commensurate with a characteristic thereof; and
   signal processing means responsive to said detection signals and operative to generate orientation indicating signals commensurate with the orientation of said sensor means about said axis of interest.

2. Orientation indicating apparatus as recited in claim 1, wherein said first detection axis is a diameter of said chamber.

3. Orientation indicating apparatus as recited in claim 2, wherein said light emitting means includes two light emitting components disposed along said central axis on opposite sides of said chamber facing each other and operative to illuminate said element.

4. Orientation indicating apparatus as recited in claim 3, wherein said sensor means further includes a predetermined quantity of liquid contained within said chamber.

5. Orientation indicating apparatus as recited in claim 4, wherein said element is a gaseous bubble that is less dense than said liquid.

6. Orientation indicating apparatus as recited in claim 5, wherein said light measuring components are photodiodes, and said light emitting components are light-emitting diodes.

7. Orientation indicating apparatus as recited in claim 6, wherein said signal processing means includes a digital instrumentation amplifier responsive to said first and second detection signals and operative to generate a corresponding orientation indicating signal, comprising energy storage means; and control means responsive to said first and second detection signals, and operative to alternately charge said energy storage means for a period determined by said first detection signal and discharge said energy storage means for a period determined by said second detection signal, said control means being further operative to generate an orientation indicating signal of a first state while said energy storage means is charging and of a second state while said energy storage means is discharging;

said orientation indicating signal being substantially a square wave the duty cycle of which is determined by said first and second detection signals.

8. Orientation indicating apparatus as recited in claim 1, wherein said light detecting means further includes third and fourth light measuring components mounted proximate said chamber on opposite sides thereof and along a second detection axis passing through said chamber, said first detection axis, said second detection axis and said central axis being mutually perpendicular, said third and fourth light measuring components operative to receive light influenced by said element and to develop corresponding third and fourth detection signals commensurate with a characteristic thereof.

9. Orientation indicating apparatus as recited in claim 8, wherein said first and second detection axes are mutually perpendicular diameters of said chamber.

10. Orientation indicating apparatus as recited in claim 9, wherein said light emitting means includes two light emitting components disposed along said central axis on opposite sides of said chamber facing each other and operative to illuminate said element.

11. Orientation indicating apparatus as recited in claim 10, wherein said sensor means further includes a predetermined quantity of liquid contained within said chamber.

12. Orientation indicating apparatus as recited in claim 11, wherein said element is a gaseous bubble that is less dense than said liquid.

13. Orientation indicating apparatus as recited in claim 12, wherein said light measuring components are photodiodes, and said light emitting components are light-emitting diodes.

14. Orientation indicating apparatus as recited in claim 13, wherein said signal processing means includes:

a first digital instrumentation amplifier responsive to said first and second detection signals and operative to generate a corresponding first orientation indicating signal, comprising first energy storage means; and first control means responsive to said first and second detection signals, and operative to alternately charge said first energy storage means for a period determined by said first detection signal and discharge said first energy storage means for a period determined by said second detection signal, said first control means being further operative to generate a first orientation indicating signal of a first state while said first energy storage means is charging and of a second state while said first energy storage means is discharging;

said first orientation indicating signal being substantially a square wave the duty cycle of which is determined by said first and second detection signals; and a second digital instrumentation amplifier responsive to said third and fourth detection signals and operative to generate a corresponding second orientation indicating signal, comprising second energy storage means; and second control means responsive to said third and fourth detection signals, and operative to alternately charge said second energy storage means for a period determined by said third detection signal and discharge said second energy storage means for a period determined by said fourth detection signal, said second control means being further operative to generate a second orientation indicating signal of a first state while said second energy storage means is charging and of a second state while said second energy storage means is discharging;

said second orientation indicating signal being substantially a square wave the duty cycle of which is determined by said third and fourth detection signals.

15. Orientation indicating apparatus as recited in claim 8, wherein said light emitting means further includes first means forming light communication pathways between said light emitting components and said chamber, and wherein said light detecting means further includes second means forming light communication pathways from said chamber to said light detecting components.

16. Orientation indicating apparatus as recited in claim 8, wherein said signal processing means includes:

a first digital instrumentation amplifier responsive to said first and second detection signals and operative to generate a corresponding first orientation indicating signal, comprising first energy storage means; and first control means responsive to said first and second detection signals, and operative to alternately charge said first energy storage means for a period determined by said first detection signal and discharge said first energy storage means for a period determined by said second detection signal, said first control means being further operative to generate a first orientation indicating signal of a first state while said first energy storage means is charging and of a second state while said first energy storage means is discharging;

said first orientation indicating signal being substantially a square wave the duty cycle of which is determined by said first and second detection signals; and a second digital instrumentation amplifier responsive to said third and fourth detection signals and operative to generate a corresponding second orientation indicating signal, comprising second energy storage means; and second control means responsive to said third and fourth detection signals, and operative to alternately charge said second energy storage means for a period determined by said third detection signal and discharge said second energy storage means for a period determined by said fourth detection signal, said second control means being further operative to generate a second orientation indicating signal of a first state while said second energy storage means is charging and of a second state while said second energy storage means is discharging;

said second orientation indicating signal being substantially a square wave the duty cycle of which is determined by said third and fourth detection signals.

17. Orientation indicating apparatus as recited in claim 1, wherein said sensor means further includes a predetermined quantity of liquid contained within said chamber.

18. Orientation indicating apparatus as recited in claim 17, wherein said element is a gaseous bubble that is less dense than said liquid.

19. Orientation indicating apparatus as recited in claim 1, wherein said light emitting means further includes first means forming light communication pathways between said light emitting components and said chamber, and wherein said light detecting means further includes second means forming light communication pathways from said chamber to said light detecting components.

20. Orientation indicating apparatus as recited in claim 1, wherein said light measuring components are photodiodes, and said light emitting components are light-emitting diodes.

21. Orientation indicating apparatus as recited in claim 1, wherein said signal processing means includes a digital instrumentation amplifier responsive to said first and second detection signals and operative to generate a corresponding orientation indicating signal, comprising energy storage means; and control means responsive to said first and second detection signals, and operative to alternately charge said energy storage means for a period determined by said first detection signal and discharge said energy storage means for a period determined by said second detection signals, said control means being further operative to generate an orientation indicating signal of a first state while said energy storage means is charging and of a second state while said energy storage means is discharging;

said orientation indicating signal being substantially a square wave the duty cycle of which is determined by said first and second detection signals.

22. A sensor for sensing orientation with respect to a horizontal plane and producing corresponding detection signals, comprising a housing forming a generally cylindrical chamber having a non-vertically oriented central axis coincident with an axis of interest;

a rotation responsive element located within said chamber and free to move therein around the perimeter of the chamber under the influence of gravity as the housing is rotated about the central axis, the element being capable of influencing the direction of light cast upon it as a function of its location within said chamber;

light emitting means including at least one light emitting component disposed along said central axis and facing said chamber and operative to illuminate said element; and light detecting means including first and second light measuring components disposed on opposite sides of said chamber and along a first detection axis passing through said chamber, said first detection axis and said central axis being mutually perpendicular, said first and second light measuring components being responsive to light influenced by said element and operative to generate corresponding first and second detection signals commensurate with a characteristic thereof.

23. A sensor as recited in claim 22 wherein said first detection axis is a diameter of said chamber.

24. A sensor as recited in claim 23, wherein said light emitting means includes two light emitting components disposed along said central axis on opposite sides of said chamber facing each other and operative to illuminate said element.

25. A sensor as recited in claim 24, further comprising a predetermined quantity of liquid contained within said chamber.

26. A sensor as recited in claim 25, wherein said element is a gaseous bubble that is less dense than said liquid.

27. A sensor as recited in claim 26, wherein said light measuring components are photodiodes, and said light emitting components are light-emitting diodes.

28. A sensor as recited in claim 22, wherein said light detecting means further includes third and fourth light measuring components mounted proximate said chamber on opposite sides thereof and along a second detection axis passing through said chamber, said first detection axis, said second detection axis and said central axis being mutually perpendicular, said third and fourth light measuring components operative to receive light influenced by said element and to develop corresponding third and fourth detection signals commensurate with a characteristic thereof.

29. A sensor as recited in claim 28, wherein said first and second detection axes are mutually perpendicular diameters of said chamber.

30. A sensor as recited in claim 29, wherein said light emitting means includes two light emitting components disposed along said central axis on opposite sides of said chamber facing each other and operative to illuminate said element.

31. A sensor as recited in claim 30, further comprising a predetermined quantity of liquid contained within said chamber.

32. A sensor as recited in claim 31, wherein said element is a gaseous bubble that is less dense than said liquid.

33. A sensor as recited in claim 32, wherein said light measuring components are photodiodes, and said light emitting components are light-emitting diodes.

34. A sensor as recited in claim 28, wherein said light emitting means further includes first means forming light communication pathways between said light emitting components and said chamber, and wherein said light detecting means further includes second means forming light communication pathways from said chamber to said light detecting components.

35. A sensor as recited in claim 22, wherein said light emitting means further includes first means forming light communication pathways between said light emitting components and said chamber, and wherein said light detecting means further includes second means forming light communication pathways from said chamber to said light detecting components.

36. A sensor as recited in claim 22, further comprising a predetermined quantity of liquid contained within said chamber.

37. A sensor as recited in claim 36, wherein said element is a gaseous bubble that is less dense than said liquid.

38. A sensor as recited in claim 22, wherein said light measuring components are photodiodes, and said light emitting components are light-emitting diodes.

39. A method of generating signals indicative of the angle of inclination of an object relative to a horizontal plane comprising the steps of:

provindg said object with means forming a generally cylindrical chamber having a central axis, said chamber being filled with a predetermined quantity of liquid, and containing a light reflective element which is free to move within said liquid and which has the characteristic that its position within said chamber is related to the angle of inclination of said object;

causing light to pass into said chamber in the direction of said central axis so as to be reflected by said light reflective element;

detecting light reflected by said element in a first direction along a diameter of said chamber and generating a corresponding first electrical signal;

detecting light reflected by said element in a second direction along said diameter of said chamber and generating a corresponding second electrical signal;

using said first and second electrical signals to provide information indicative of the angle of inclination of said object;

converting said information into a pulse width modulated signal whose duty cycle is indicative of the angle of inclination of said object; and using said pulse width modulated signal as an input to a computer driven system.

40. A method of generating signals as recited in claim 39 and further comprising the steps of:

detecting light reflected by said element in a third direction along another diameter of said chamber orthogonal to said first mentioned diameter and generating a corresponding third electrical signal;

detecting light reflected by said element in a fourth direction along said other diameter of said chamber and generating a corresponding fourth electrical signal; and using said third and fourth electrical signals in combination with said first and second electrical signals to provide information indicative of the angle of inclination of said object.

41. A method of generating signals as recited in claim 40 and further comprising the steps of:

converting said information into a pulse width modulated signal whose duty cycle is indicative of the angle of inclination of said object; and using said pulse width modulated signal as an input to a computer driven system.

42. Orientation indicating apparatus for indicating angular position about an axis of interest, comprising:

sensor means including a housing forming a generally cylindrical chamber having a non-vertically oriented central axis coincident with the axis of interest;

a rotation responsive element located within said chamber and free to move therein around the perimeter of the chamber under the influence of gravity as the housing is rotated about the central axis, the element being capable of influencing the direction of light cast upon it as a function of its location within said chamber;

light emitting means disposed along said central axis, including at least one light emitting component disposed along said central axis and facing said chamber and operative to illuminate said element; and light detecting means including first and second light measuring components disposed on opposite sides of said chamber, along radial lines extending from said central axis and mutually perpendicular thereto, said first and second light measuring components being responsive to light influenced by said element and operative to generate corresponding first and second detection signals commensurate with a characteristic thereof; and signal processing means responsive to said detection signals and operative to detect a difference therebetween and to generate a corresponding signal indicative of the orientation of said sensor means about said axis of interest.

43. A sensor for sensing orientation with respect to a horizontal plane and producing corresponding detection signals, comprising a housing forming a generally cylindrical chamber having a non-vertically oriented central axis coincident with an axis of interest;

a rotation responsive element located within said chamber and free to move therein around the perimeter of the chamber under the influence of gravity as the housing is rotated about the central axis, the element being capable of influencing the direction of light cast upon it as a function of its location within said chamber;

light emitting means including at least one light emitting component disposed along said central axis and facing said chamber and operative to illuminate said element; and light detecting means including first and second light measuring components disposed on opposite sides of said chamber, along radial lines extending from said central axis and mutually perpendicular thereto, said first and second light measuring components being responsive to light influenced by said element and operative to generate corresponding first and second detection signals commensurate with a characteristic thereof.

44. A method of generating signals indicative of the angle of inclination of an object relative to a horizontal plane comprising the steps of:

providing said object with means forming a generally cylindrical chamber having a central axis, said chamber being filled with a predetermined quantity of liquid, and containing a light reflective element which is free to move within said liquid and which has the characteristic that its position within said chamber is related to the angle of inclination of said object;

causing light to pass into said chamber in the direction of said central axis so as to be reflected by said light reflective element;

detecting light reflected by said element in a first direction along a first radial line of said chamber, said first radial line extending from said central axis and mutually perpendicular thereto, and generating a corresponding first electrical signal;

detecting light reflected by said element in a second direction along a second radial line of said chamber, said second radial line extending from said central axis and mutually perpendicular thereto, and generating a corresponding second electrical signal;

using a difference between said first and second electrical signals to provide information indicative of the angle of inclination of said object;

converting said information into a pulse width modulated signal whose duty cycle is indicative of the angle of inclination of said object; and using said pulse width modulated signal as an input to a computer driven system.

* * * * *